(12) United States Patent
Rapisarda

(10) Patent No.: US 7,852,255 B2
(45) Date of Patent: Dec. 14, 2010

(54) MOTION ACTIVATED REMOTE CONTROL BACK-LIGHTING

(76) Inventor: Carmen Rapisarda, 21211 Wisteria St., Apple Valley, CA (US) 92308-7940

(*) Notice: Subject to any disclaimer, the term of this patent is extended or adjusted under 35 U.S.C. 154(b) by 356 days.

(21) Appl. No.: 12/028,284

(22) Filed: Feb. 8, 2008

(65) Prior Publication Data

US 2009/0033537 A1 Feb. 5, 2009

Related U.S. Application Data

(63) Continuation-in-part of application No. 11/831,752, filed on Jul. 31, 2007.

(51) Int. Cl.
*H04L 17/02* (2006.01)
(52) U.S. Cl. .................. 341/176; 340/669; 200/308
(58) Field of Classification Search .......... 341/176, 341/20, 158, 169; 340/825.72, 686.11, 687.68, 340/825.69; 362/26; 200/34; 348/734; 398/106–116
See application file for complete search history.

(56) References Cited

U.S. PATENT DOCUMENTS 5,977,901 A * 11/1999 Fenner ................... 341/176
6,906,700 B1 * 6/2005 Armstrong ............... 345/161

* cited by examiner

*Primary Examiner*—Anabel M Ton
(74) *Attorney, Agent, or Firm*—Kenneth L. Green

(57) ABSTRACT

A remote control includes at least one spring motion switch and an electrical circuit to control remote control functions when the remote control is moved. In one embodiment, the motion switch activates keyboard back-lighting. A single spring motion switch may be used or two spring motion switches may be positioned approximately orthogonally, for example, a first spring motion switch to activate on motion along the remote control's length L, and a second spring motion switch to activate on motion along the remote control's width W. One simple and inexpensive motion switch is a cantilevered spring. The remote control according to the present invention with back-lighting activated by remote control motion is particularly useful when viewing a video or listening to music in low light.

15 Claims, 2 Drawing Sheets

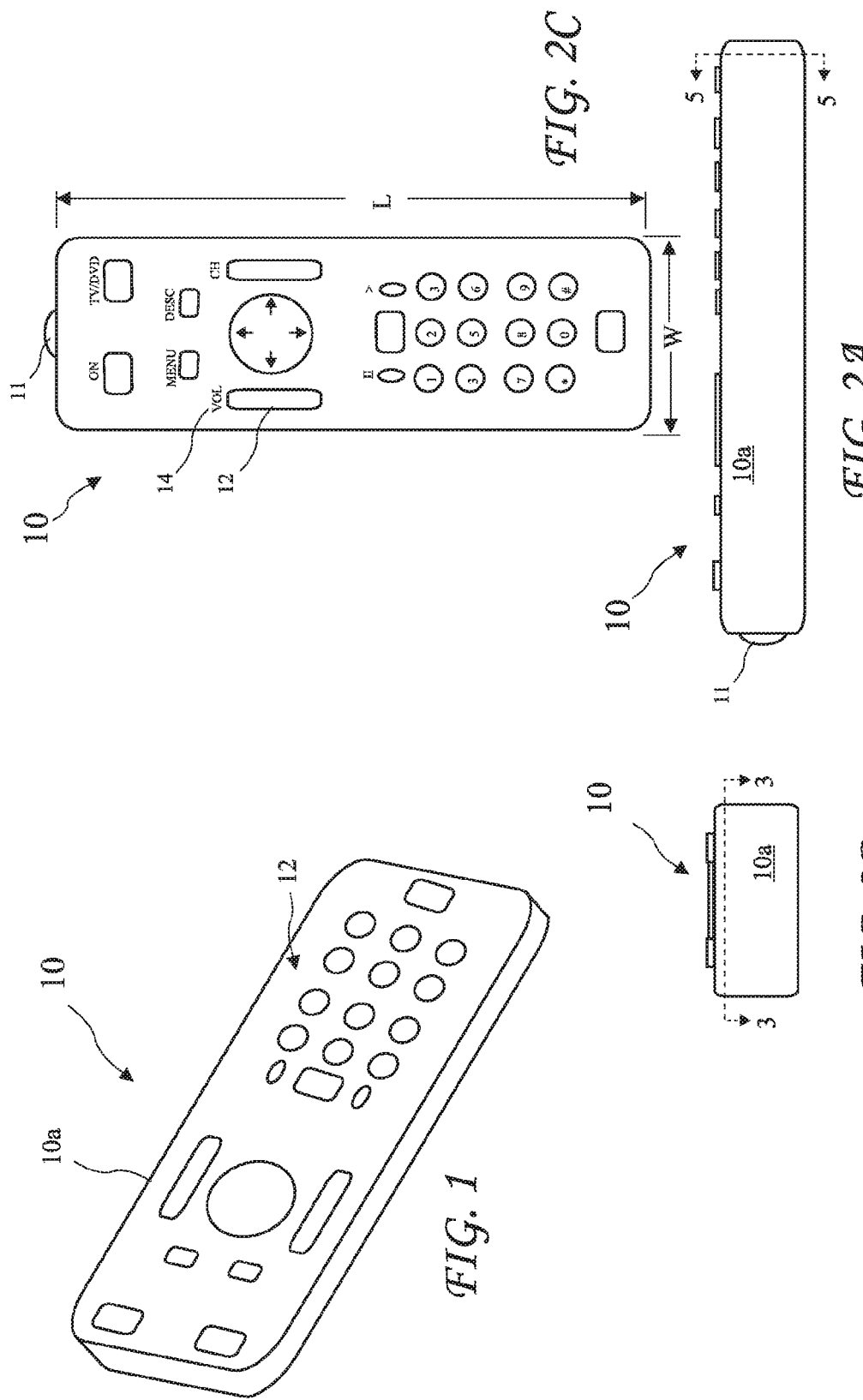

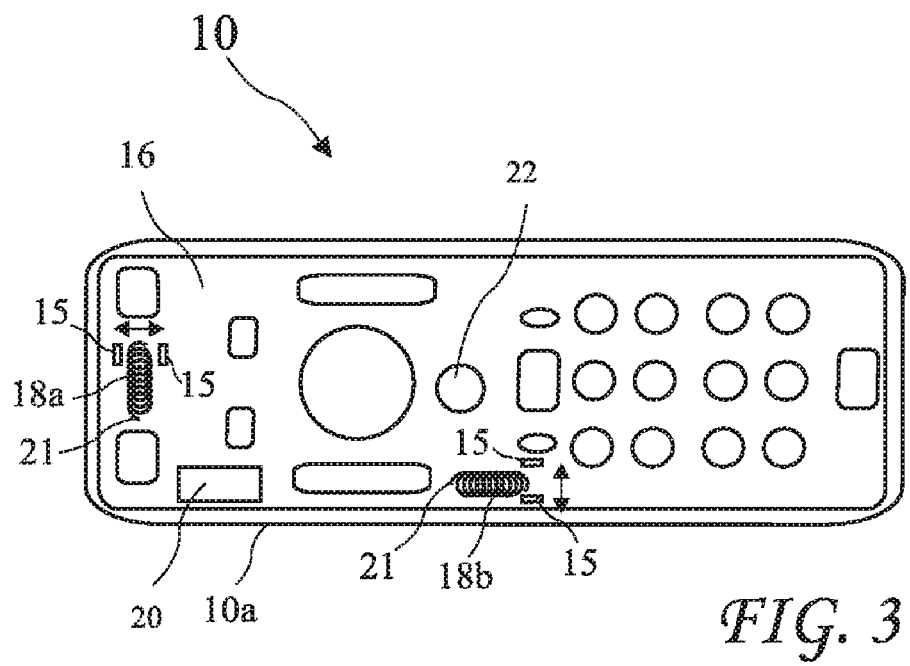
FIG. 3
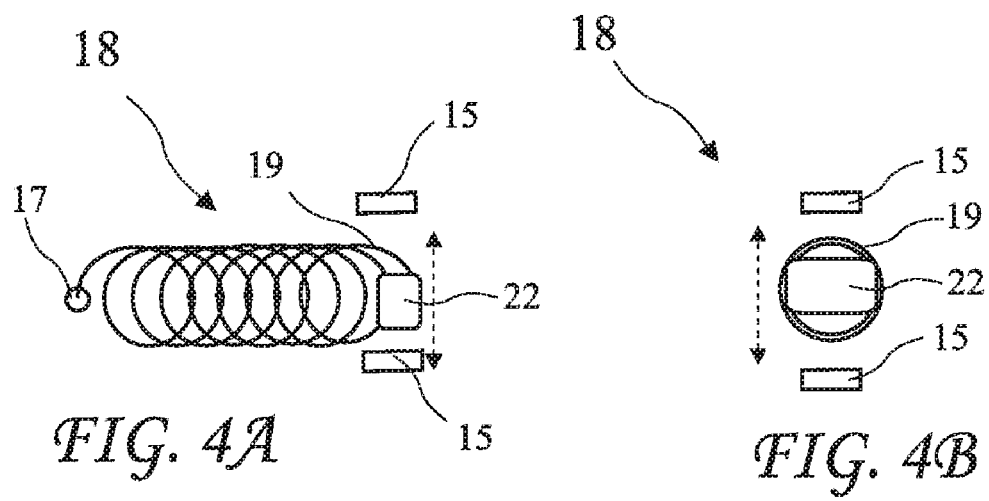
FIG. 4A
FIG. 4B
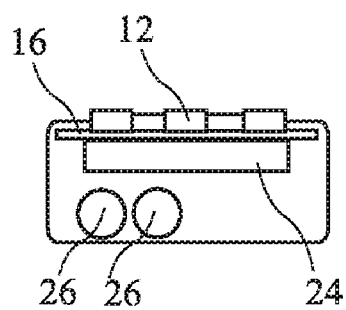
FIG. 5

US 7,852,255 B2
1
MOTION ACTIVATED REMOTE CONTROL BACK-LIGHTING

The present application is a Continuation In Part of U.S. patent application Ser. No. 11/831,752 filed Jul. 31, 2007, which application is incorporated in its entirety herein by reference.

BACKGROUND OF THE INVENTION

The present invention relates to remote controls and in particular to motion activation of remote control functions.

Remote controls are a common place accessory used by nearly all members of our society. Remote controls have provided convenience and efficiency by enabling control of devices, for example, televisions and audio equipment, without leaving a seating area. Many remote controls include keys for controlling several audio-video components, and the keys are labeled for identification. Unfortunately, in dim light or night conditions, the keys are difficult to find or the labels are difficult to read.

BRIEF SUMMARY OF THE INVENTION

The present invention addresses the above and other needs by providing a remote control which includes at least one motion switch and an electrical circuit to control remote control functions when the remote control is moved. In one embodiment, the motion switch activates keyboard back-lighting. A single motion switch may be used or two motion switches may be positioned approximately orthogonally, for example, a first motion switch to activate on motion along the remote control's length, and a second motion switch to activate on motion along the remote control's width. One simple and inexpensive motion switch is a cantilevered spring. The remote control according to the present invention with back-lighting activated by remote control motion is particularly useful when viewing a video or listening to music in low light.

In accordance with one aspect of the invention, there is provided a remote control with inertially responsive spring-mass system activated lighting. The remote control includes a housing, keys residing on a surface of the housing for controlling remote control functions, a circuit board residing inside the housing, lighting, and an inertially responsive spring-mass system. The circuit board receives inputs from the keys and performs the remote control functions and the lighting facilitates viewing of the remote control in low light conditions. The lighting may be key and/or key label back-lighting allowing use of the remote control in low light conditions and/or an external light for locating the remote control when dropped in low light conditions. The inertially responsive spring-mass system includes a fixed end fixed with respect to the housing and a free end opposite the fixed end for electrically contacting a contact during a movement of the remote control, thereby switching on the lighting for a period of time.

In accordance with another aspect of the invention, there is provided a remote control with motion activated back-lighting. The remote control includes a housing, keys residing on a surface of the housing for controlling remote control functions, a circuit board and back-lighting inside the housing, and at least one spring motion switch. The circuit board receives inputs from the keys and performs remote control functions and the back-lighting facilitates viewing of the keys in low light environments. The at least one spring motion switch is attached to the remote control aligned to sense motion along the length and/or the width of the remote control 2
for sensing motion of the remote control. An electrical signal sensing circuit senses a signal from the spring motion switch(s) when the remote control is moved and activates the back-lighting for a period of time following the motion of the remote control.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is a perspective view of a remote control.

FIG. 2A is a side view of the remote control with the cover closed.

FIG. 2B is an end view of the remote control with the cover closed.

FIG. 2C is a top view of the remote control with the cover closed.

FIG. 3 is a cross-sectional view of a remote control including spring motion switches for activating lighting according to the present invention, taken along line 3-3 of FIG. 2B.

FIG. 4A is a side view of the spring motion switch.

FIG. 4B is an end view of the spring motion switch.

FIG. 5 is a cross-sectional view of the remote control taken along line 5-5 of FIG. 2A.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A perspective view of a remote control 10 showing keys 12 on a remote control housing (or case) 10a is shown in FIG. 1. A side view of the remote control 10 is shown in FIG. 2A, an end view of the remote control 10 shown in FIG. 2B, and a top view of the remote control 10 is shown in FIG. 2C. The remote control 10 has a length L and a width W. The remote control keys 12 often includes twenty or more keys with at least some of the keys 12 arranged in columns along the length of the remote control 10 and in rows along the width of the remote control 10. As the number of keys 12 has increased to allow control of multiple audio-video devices, the keys 12 have become both harder to see and to use, and in low light, labels 14 for individual keys, are nearly impossible to read. The remote control 10 may further include an external light 11.

A cross-sectional view of the remote control 10 including spring motion switches 18a and/or 18b according to the present invention, taken along line 3-3 of FIG. 2B, is shown in FIG. 3. The remote control 10 includes a circuit board 16 having an electronic circuit 24 (see FIG. 5) for processing key strokes, a source for back-lighting 22, and a least one spring motion switch(s) 18a and/or 18b, all preferably mounted to a base 17. The back-lighting may alternatively be provided by individual lights for each key 12 and/or label 14, or may be located anywhere within the housing 10a. The signals from the spring motion switch(s) 18a and/or 18b may be used to control device functions, and preferably activate or re-activate back-lighting 22 or external light 11, but is not limited and may activate any remote control function, for example, turn on or off devices or return to a previous channel, and may be set at production, or more preferably, user programable.

The signals from the spring motion switch(s) 18a and/or 18b are preferably used to activate or re-active key backlighting to aid viewing the keys 12 and/or the labels 14 in low light conditions, or to activate external lighting 11 (see FIG. 2C) on the remote control, thus assisting a user in locating a dropped remote control 10. The external lighting 11 may be on the front, back, sides, and/or ends of the remote control 10 and may comprise more than one external light 11. The spring motion switch(s) 18a and/or 18b are preferably mounted to the circuit board 16 or to an inside surface of the housing 10a, and are electrically connected to an electrical signal sensing circuit 20 which may be part of the electrical circuit 24 (see FIG. 5) of the circuit board 16 or a separate circuit.

The motion switches according to the present invention preferably comprise one or more spring switches 18 shown in side view in FIG. 4A and in end view in FIG. 4B. The spring motion switches 18 are preferably solidly attached at a first (or fixed) end 17 at an attachment point 21 (see FIG. 3) inside the housing 10a and are cantilevered allowing a second (or free) end 19 to move in response to motion of the remote control 10. Contacts 15 (also see FIG. 3) on opposite sides of the free end 19, make electrical contact with the free end 19 due to motion of the remote control 10 and provides a signal to an electrical circuit preferably on the circuit board 16 to activate the remote control functions, for example, backlighting. The spring motion switch 18a above the keys 12 (see FIG. 3) may be activated by a forward and/or rearward lengthwise motion of the remote control 10, and the spring motion switch 18b beside the keys 12 (see FIG. 3) may be activated by a side to side widthwise motion of the remote control 10. A mass 22 may be attached to the free end 19 to increase the movement of the free end 19 and/or make electrical contact with the contacts 15.

A cross-sectional view of the remote control 10 taken along line 5-5 of FIG. 2A is shown in FIG. 5. The remote control 10 includes batteries 26 providing power for operation and an electrical circuit 24 preferably residing on the circuit board 16. The electrical circuit 24 preferably includes the electrical signal sensing circuit responsive to the spring motion switched 18a and 18b for controlling functions of the remote control 10.

While the invention herein disclosed has been described by means of specific embodiments and applications thereof, numerous modifications and variations could be made thereto by those skilled in the art without departing from the scope of the invention set forth in the claims.

I claim:

1. A remote control comprising:
   a remote control housing;
   keys residing on the housing for controlling remote control functions;
   an electrical circuit inside the housing receiving inputs from the keys and performing remote control functions; and
   a spring motion switch responsive to motion of the housing, the spring motion switch electrically connected to the electrical circuit to control at least one of the remote control functions, the spring motion switch comprising a spring and a contact proximal to a free end of the spring, wherein sufficient motion of the housing causes the free end of the spring to translate and make an electrical connection with the contact, wherein the remote control has a length L and a width W and the spring motion switch is selected from the group consisting of at least one of:
   a first spring motion switch aligned to respond to motion along the length L; and
   a second spring motion switch aligned to respond to motion along the width W.

2. The remote control of claim 1, wherein the contact comprises two contacts on opposite sides of the free end of the spring.

3. The remote control of claim 1, wherein
   the spring motion switch comprises a first spring motion switch aligned to respond to motion along the length L.

4. The remote control of claim 1, wherein
   the spring motion switch comprises a second spring motion switch aligned to respond to motion along the width W.

5. The remote control of claim 1, wherein
   the remote control has a length L and a width W; and
   the spring motion switch comprises:
   a first spring motion switch aligned to respond to motion along the length L; and
   a second spring motion switch aligned to respond to motion along the width W.

6. The remote control of claim 5, wherein each spring motion switch comprises:
   a spring;
   a fixed end of the spring fixed with respect to the remote control housing;
   a free end of the spring; and
   a contact proximal to the free end of the spring, wherein sufficient motion of the housing causes the spring to translate and the free end of the spring to make an electrical connection with the contact.

7. The remote control of claim 6, wherein each contact comprises a pair of contacts on opposite sides of the free end of each spring.

8. The remote control of claim 1, wherein the device functions include back lighting for facilitating viewing of the keys in low light environments and the spring motion switch is electrically connected to the electrical circuit to activate and to re-activate the back-lighting.

9. The remote control of claim 8, wherein:
   the housing includes labels for identifying the keys; and
   the back-lighting illuminates the labels.

10. A remote control comprising:
    a housing having a length L and a width W;
    keys residing on a surface of the housing for controlling remote control functions;
    a circuit board inside the housing receiving inputs from the keys and performing the remote control functions;
    back-lighting inside the remote control for facilitating viewing of the remote control keys in low light conditions;
    at least one spring motion switch attached to the remote control for sensing motion of the remote control, and
    an electrical signal sensing circuit of the circuit board, the electrical signal sensing circuit sensing a signal from the spring motion switch when the remote control is moved and activating the back-lighting for a period of time following the motion of the remote control.

11. The remote control of claim 8, wherein the back-lighting further illuminates key labels.

12. A remote control comprising:
    a housing;
    keys residing along a surface of the housing for controlling remote control functions;
    an electrical circuit residing inside the housing receiving inputs from the keys and performing the remote control functions;

back-lighting for facilitating viewing of keys and labels of the remote control in low light environments; and an inertially responsive spring-mass system having a fixed end fixed with respect to the housing and a free end opposite the fixed end for electrically contacting either of a pair of contacts residing on opposite sides of the free end of the spring during a movement of the remote control, wherein the electrical contact between the spring to the contacts switches on the back-lighting for a period of time.

13. The remote control of claim 12, wherein the inertially responsive spring-mass system switches on external lighting for a period of time.

14. The remote control of claim 12, wherein a mass is attached to the free end of the spring-mass system.

15. The remote control of claim 12, wherein the remote control has a length L and a width W; and the spring-mass system comprises:

a first spring-mass system aligned to respond to motion along the remote control length L; and a second spring-mass system aligned to respond to motion along the remote control width W.

* * * * *